US011488095B2

(12) United States Patent
Deshpande et al.

(10) Patent No.: US 11,488,095 B2
(45) Date of Patent: *Nov. 1, 2022

(54) DATA DELIVERY AND VALIDATION IN HYBRID CLOUD ENVIRONMENTS

(71) Applicant: DoorDash, Inc., San Francisco, CA (US)

(72) Inventors: Ajay A. Deshpande, White Plains, NY (US); Saurabh Gupta, Dallas, TX (US); Arun Hampapur, Norwalk, CT (US); Pradyumnha G. Kowlani, Foster City, CA (US); Xuan Liu, Yorktown Heights, NY (US); Christopher S. Milite, Oxford, CT (US); Brian L. Quanz, Yorktown Heights, NY (US); Chek Keong Tan, Danbury, CT (US); Dahai Xing, White Plains, NY (US)

(73) Assignee: DoorDash, Inc., San Francisco, CA (US)

( * ) Notice: Subject to any disclaimer, the term of this patent is extended or adjusted under 35 U.S.C. 154(b) by 296 days.

This patent is subject to a terminal disclaimer.

(21) Appl. No.: 16/400,291

(22) Filed: May 1, 2019

(65) Prior Publication Data

US 2019/0258998 A1 Aug. 22, 2019

Related U.S. Application Data

(63) Continuation of application No. 15/087,012, filed on Mar. 31, 2016, now Pat. No. 10,373,101.
(Continued)

(51) Int. Cl.
*G06F 16/00* (2019.01)
*G06Q 10/08* (2012.01)
(Continued)

(52) U.S. Cl.
CPC ..... *G06Q 10/08345* (2013.01); *G06F 3/0482* (2013.01); *G06F 3/04847* (2013.01);
(Continued)

(58) Field of Classification Search
CPC .......... G06Q 10/08345; G06Q 10/083; G06Q 10/087; G06Q 10/0833; G06Q 30/0283;
(Continued)

(56) References Cited

U.S. PATENT DOCUMENTS

| 7,050,938 B1 | 5/2006 | Prater et al. |
| 7,370,005 B1 | 5/2008 | Ham et al. |

(Continued)

FOREIGN PATENT DOCUMENTS

WO 2005/067434 A1 7/2005

OTHER PUBLICATIONS

NIST, "NIST Cloud Computing Program", http://csrc.nist.gov/groups/SNS/cloud-computing/index.html, Created on Nov. 15, 2010, Last updated on Mar. 2, 2016, 2 pages.
(Continued)

*Primary Examiner* — Noosha Arjomandi
(74) *Attorney, Agent, or Firm* — Kilpatrick Townsend & Stockton LLP

(57) ABSTRACT

Data content delivery and validation in a computer environment may provide a file system in the computer environment, the file system subdivided into unique folder locations per content type, each of the unique folder locations representing a content type folder. The file system is monitored for changes to a content type folder. An occurrence of a manifest file in the content type folder may be detected, the occurrence of the manifest file ensuring that all files in a package of files associated with the manifest file have arrived. Content of the manifest file may be analyzed to check validity of the files. A content package registry may be
(Continued)

queried to determine a base job for processing a given content type associated with the package of files, and the base job may be run to process the package of files.

20 Claims, 4 Drawing Sheets

Related U.S. Application Data

(60) Provisional application No. 62/279,738, filed on Jan. 16, 2016.

(51) Int. Cl.

| | |
|---|---|
| *G06Q 30/02* | (2012.01) |
| *G06N 20/00* | (2019.01) |
| *G06F 16/14* | (2019.01) |
| *G06F 16/182* | (2019.01) |
| *G06F 16/17* | (2019.01) |
| *G06F 16/23* | (2019.01) |
| *G06N 5/00* | (2006.01) |
| *G06F 3/0482* | (2013.01) |
| *G06F 3/04847* | (2022.01) |
| *G06Q 30/06* | (2012.01) |
| *H04L 43/0882* | (2022.01) |
| *G06N 5/04* | (2006.01) |
| *G06Q 10/06* | (2012.01) |
| *H04L 43/16* | (2022.01) |
| *H04L 43/0876* | (2022.01) |

(52) U.S. Cl.
CPC ........ *G06F 16/148* (2019.01); *G06F 16/1734* (2019.01); *G06F 16/183* (2019.01); *G06F 16/1844* (2019.01); *G06F 16/2365* (2019.01); *G06N 5/003* (2013.01); *G06N 5/04* (2013.01); *G06N 5/045* (2013.01); *G06N 20/00* (2019.01); *G06Q 10/0633* (2013.01); *G06Q 10/06315* (2013.01); *G06Q 10/06375* (2013.01); *G06Q 10/083* (2013.01); *G06Q 10/087* (2013.01); *G06Q 10/0833* (2013.01); *G06Q 10/0838* (2013.01); *G06Q 10/0875* (2013.01); *G06Q 30/0201* (2013.01); *G06Q 30/0206* (2013.01); *G06Q 30/0283* (2013.01); *G06Q 30/0284* (2013.01); *G06Q 30/0635* (2013.01); *H04L 43/0882* (2013.01); *H04L 43/16* (2013.01); *H04L 43/0876* (2013.01)

(58) Field of Classification Search
CPC ......... G06Q 30/0635; G06Q 10/06315; G06Q 30/0201; G06Q 30/0206; G06Q 10/06375; G06Q 10/0633; G06Q 10/0838; G06Q 10/0875; G06Q 30/0284; G06N 5/003; G06N 20/00; G06N 5/04; G06N 5/045; G06F 16/148; G06F 16/183; G06F 16/1734; G06F 16/1844; G06F 16/2365; G06F 3/0482; G06F 3/04847; G06F 11/08; G06F 11/14; H04L 43/0882; H04L 43/16; H04L 43/0876
See application file for complete search history.

(56) References Cited

U.S. PATENT DOCUMENTS

| | | | |
|---|---|---|---|
| 7,917,387 | B2 | 3/2011 | Spurr et al. |
| 8,065,172 | B2 | 11/2011 | Mauthe et al. |
| 8,249,917 | B1 | 8/2012 | Kassmann et al. |
| 8,700,443 | B1 | 4/2014 | Murray et al. |
| 8,977,596 | B2 * | 3/2015 | Montulli ............... G06F 16/137 707/640 |
| 9,063,789 | B2 | 6/2015 | Beaty et al. |
| 9,112,836 | B2 | 8/2015 | Ferris |
| 9,324,048 | B2 | 4/2016 | Ptak et al. |
| 9,940,603 | B1 | 4/2018 | Caven et al. |
| 10,009,251 | B1 | 6/2018 | Koster et al. |
| 10,373,101 | B2 * | 8/2019 | Deshpande ........ G06Q 10/0833 |
| 11,061,922 | B2 * | 7/2021 | Henderson ............ G06F 16/951 |
| 2002/0032573 | A1 | 3/2002 | Williams et al. |
| 2002/0156663 | A1 | 10/2002 | Weber et al. |
| 2003/0093388 | A1 | 5/2003 | Albright |
| 2007/0130201 | A1 | 6/2007 | Ratliff et al. |
| 2011/0320469 | A1 | 12/2011 | Canessa et al. |
| 2012/0151472 | A1 * | 6/2012 | Koch ................... G06F 9/45558 718/1 |
| 2013/0326487 | A1 * | 12/2013 | Yousouf ................. G06F 9/455 717/134 |
| 2014/0059226 | A1 * | 2/2014 | Messerli ............. H04L 12/4641 709/226 |
| 2014/0108474 | A1 | 4/2014 | David et al. |
| 2014/0136255 | A1 | 5/2014 | Grabovski et al. |
| 2014/0181021 | A1 * | 6/2014 | Montulli ............... G06F 16/137 707/624 |
| 2014/0310048 | A1 | 10/2014 | Murray et al. |
| 2014/0337086 | A1 | 11/2014 | Asenjo et al. |
| 2015/0039443 | A1 | 2/2015 | Soon-Shiong |
| 2015/0052019 | A1 | 2/2015 | Field-Darraugh et al. |
| 2015/0112905 | A1 | 4/2015 | Miner et al. |
| 2015/0112906 | A1 | 4/2015 | Gauthier et al. |
| 2015/0178146 | A1 * | 6/2015 | Adikari ................. G06F 11/10 714/48 |
| 2015/0281356 | A1 | 10/2015 | Maturana et al. |
| 2015/0333899 | A1 | 11/2015 | Nobauer et al. |
| 2016/0171540 | A1 | 6/2016 | Mangipudi et al. |
| 2016/0217381 | A1 | 7/2016 | Bloomquist et al. |
| 2016/0246662 | A1 * | 8/2016 | Meng ................. G06F 11/0757 |
| 2016/0291876 | A1 | 10/2016 | Alatorre et al. |
| 2016/0350173 | A1 * | 12/2016 | Ahad ...................... H04L 67/02 |
| 2017/0041296 | A1 | 2/2017 | Ford et al. |
| 2017/0063724 | A1 | 3/2017 | Cao et al. |
| 2017/0083967 | A1 | 3/2017 | Shiely et al. |
| 2017/0124340 | A1 | 5/2017 | Chiu et al. |
| 2017/0140328 | A1 | 5/2017 | Downs et al. |
| 2017/0177613 | A1 * | 6/2017 | Sharma .................. G06F 21/45 |
| 2019/0258998 | A1 * | 8/2019 | Deshpande .......... G06Q 10/083 |
| 2021/0182083 | A1 * | 6/2021 | Pragya ................. G06F 11/323 |

OTHER PUBLICATIONS

List of IBM Patents or Patent Applications Treated as Related, dated May 1, 2019, 2 pages.

Mell et al. "The NIST definition of Cloud Computing," NIST Special Publication 800-145, National Institute of Standards and Technology, U.S. Department of Commerce. Sep. 2011, pp. 1-7.

Office Action dated Apr. 21, 2020 received in U.S. Appl. No. 15/153,963, 30 pages.

\* cited by examiner

DATA DELIVERY AND VALIDATION IN HYBRID CLOUD ENVIRONMENTS

FIELD

The present application relates generally to computers and computer applications, and more particularly to cloud architecture, data transport, content delivery and validation mechanism in hybrid cloud environments, and predictive analytics and optimization.

BACKGROUND

Software as a Service (SaaS) allows consumers to use a provider's application running on a cloud infrastructure. Big data analytics examines and analyzes large data sets of a variety of data types and uncovers patterns, correlations, trends in the market, preferences of users or customers, and other useful information. To extend the capabilities of on-premise transaction systems and systems of record, a system such as an omni-channel retailer system may look at leveraging SaaS hosted or similarly hosted big data analytics platforms.

BRIEF SUMMARY

A method and system of data content delivery and validation in a computer environment comprising a shared pool of configurable computing resources may be provided. The method, in one aspect, may include providing a file system in the computer environment, the file system subdivided into unique folder locations per content type, each of the unique folder locations representing a content type folder. The method may also include monitoring by a file system monitor executing in the computer environment, changes to a content type folder. The method may further include detecting based on the monitoring, an occurrence of a manifest file in the content type folder, the occurrence of the manifest file ensuring that all files in a package of files associated with the manifest file have arrived. The method may also include, responsive to detecting the occurrence of the manifest file, analyzing content of the manifest file to check validity of the files and initiating processing of the package of files. The method may further include querying, by the file system monitor executing in the computer environment, a content package registry to determine a base job for processing a given content type associated with the package of files. The method may also include running the base job in the computer environment to process the package of files.

A system of data content delivery and validation in a computer environment comprising a shared pool of configurable computing resources, in one aspect, may include one or more storage devices providing a file system in the computer environment, the file system subdivided into unique folder locations per content type, each of the unique folder locations representing a content type folder. A file system server may provide services of the file system. One or more hardware processors may be coupled to the one or more storage devices, and operable to monitor changes to a content type folder. One or more of the hardware processors may be further operable to detect based on monitoring, an occurrence of a manifest file in the content type folder, the occurrence of the manifest file ensuring that all files in a package of files associated with the manifest file have arrived. Responsive to detecting the occurrence of the manifest file, one or more hardware processors may be further operable to analyze content of the manifest file to check validity of the files and initiate processing of the package of files. One or more hardware processors may be further operable to query a content package registry to determine a base job for processing a given content type associated with the package of files. One or more hardware processors may be further operable to run the base job in the computer environment to process the package of files.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
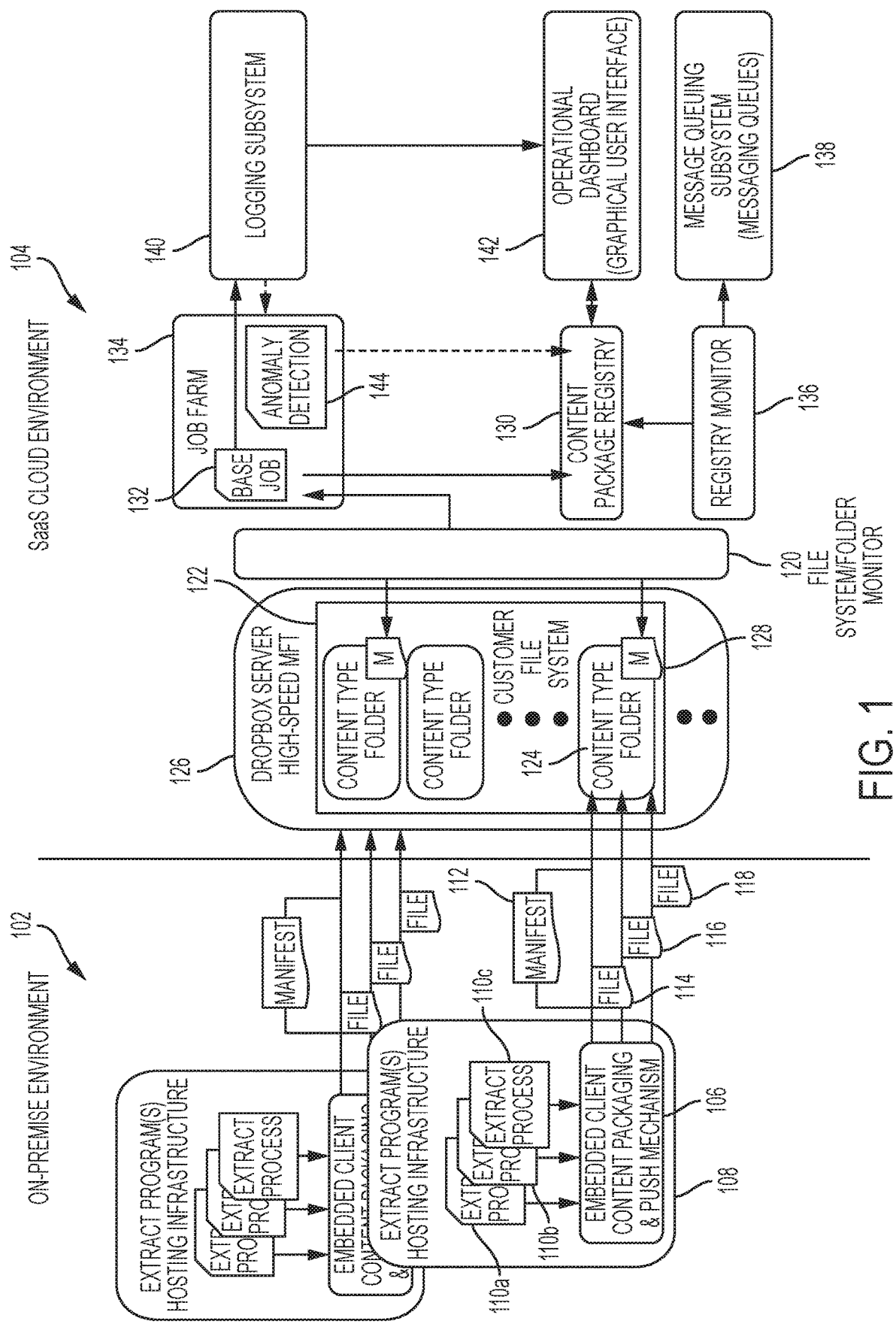
FIG. 1 is a diagram illustrating system architecture in one embodiment of the present disclosure.

A method, system and technique for data transport may be provided that help ensure that the regularly scheduled and on-demand data extracts from on-premise systems are reliably delivered to the cloud, validated for completeness and accurately loaded to target systems and data stores, for example, so that the data can be consumed by analytical processes when required. The data transport mechanism of the present disclosure in one embodiment may be leverage by an entity, for example, looking to leverage and integrate Software as a Service (SaaS) based Big Data services with on-premise systems of record and transactional systems. An example of such entity may include, but are not limited to an omni-channel retailer, for example, looking at leveraging SaaS hosted Big Data Analytics platforms to extend the capabilities of their on-premise transactional systems and systems of record. As most retailers tightly control their systems of record and related extract processes, an easily integrated "push" mechanism should be utilized to loosely couple the on-premise systems from the Cloud hosted infrastructure and services, allowing the SaaS service provider to monitor, track, validate and report on content delivery and post delivery operations.

It is understood in advance that although this disclosure includes a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A system in the present disclosure in one embodiment provides a minimally invasive embedded-client for content packaging and transfer from on-premise environments with a SaaS hosted Big Data Analytic backend capable of tracking the reception of content packages and automating the processing of those packages including validation. Validation may include content package completeness, the adherence to scheduling requirements and the ability to publish the content processing messages to downstream subscribers for subsequent post-processing automation. Comprehensive logging for content related activities may be provided, for example, reception, validation, loading, post-processing activities. Analytics hosting capacity and an anomaly detection may be provided to analyze the historical data as compared to current processing steps allowing for content validation. An operational dashboard allows for configuring and monitoring the automation of content feeds in hybrid architecture.

FIG. 1 is a diagram illustrating system architecture in one embodiment of the present disclosure. The components run on one or more hardware processors, for example, in an on-premise environment shown at 102 and in a Cloud environment, for example, SaaS Cloud environment shown at 104. An embedded client program or module 106 executable on one or more processors is provided and can be placed on any number of hosts 108 and any instance can support multiple extract programs 110*a*, 110*b*, 110*c*. In one embodiment, the embedded client 106 is a small, lightweight, "zero-footprint", and enables a content packaging and push mechanism. In one embodiment, the embedded client 106 can be installed and integrated into an entity's (e.g., retailer's) on-premise hosting environment 102 and leveraged by current data extract processes (e.g., 110*a*, 110*b*, 110*c*) in a minimally invasive way.

A content delivery manifest file (e.g., 112) is provided, which describes the complete set of files (e.g., 114, 116, 118) that make up a content package, allowing the package's individual assets to be delivered in separate and parallel threads and allowing the receiving system to have a reliable trigger to begin the processing of the associated parts (and validate part delivery). In one embodiment, the content packaging and push mechanism provided by the client 106 wraps all files that make up a complete content package in a transaction. In one embodiment, each file (e.g., 114, 116, 118) in the package is sent via a separate thread and monitored independently, once all files that make up the package are transferred, the manifest file (e.g., 112) is create and sent.

In one embodiment, each user or customer is provided a secure file system 122. An example of such a file system may include, but is not limited to, a DropBox file system or the like that provides synchronized file access mechanism from different access devices. In one embodiment, the file system 122 is subdivided into unique folder locations per content type, for example, as shown at 124. A file system server 126, for example, a DropBox Server provides services of the file system 122. A file system and folder monitoring subsystem 120 is provided that automatically monitors a customer's cloud hosted content file system 122 (e.g., drop boxes) for the arrival of content from registered on-premise push embedded clients 106. In one embodiment, although all arriving files are detected, package processing is only triggered by the arrival of package manifest files, e.g., as shown at 128. The file system/folder monitor 120 detects all changes to the customer's content type folders 124. In one embodiment, processing is only initiated when an occurrence of a manifest file 128 is detected ensuring that no processing occurs until all package files have arrived. The manifest content is analyzed to check package validity, for instance, whether the files as indicated in the manifest file have been received correctly. In one embodiment, package validation includes ensuring all files identified for the transfer have in fact arrived in the drop box content folder and ensuring that each file's size matches the file size recorded in the manifest. If the file list does not match the file list in the manifest, the package is incomplete and should not be processed. If the size any individual package file does not match that of the manifest, the transfer for that particular file did not complete successfully and the package is incomplete and should not be processed.

A content package registry 130 is provided, which allows for the registration of various content types and expected delivery schedules, for example, per cloud hosted drop box or file system 122. In one embodiment, the content types specify the content delivery manifest names according to the content delivery manifest naming convention. In one embodiment, the expected delivery schedules specify the delivery frequency and the anticipate delivery time window. The content package registry 130 in one embodiment also records a content arrival script. The content arrival script includes an executable job that is run when a package arrives of a certain content type. When a manifest file is detected by the file monitor 120, and validation is successful, the content package registry 130 is checked to determine what job should be run for processing the content. The content package registry 130 in one embodiment also records the publish/subscribe queue utilized to notify third party processes of content arrival for additional post-processing. A host system (e.g., 102) may have registered the information previously to sending a file package to the Cloud environment (e.g., 104).

A registry monitor 136 is provided that periodically evaluates the contents of the content package registry 130. The registry monitor determines if packages have been delivered in accordance with recorded schedules and if latency thresholds have been exceeded for triggering error processing and/or communication such as alerts.

A message queuing subsystem 138 is provided that supports publish/subscribe message queues for third party integration and post-processing. A third party integration and/or post processing may include any downstream process. For example, if the arrival of content type X (e.g., Order Status) allows for the calculation of a derived content type Y (Beginning of day Backlog), the job that calculates Y may subscribe to messages that designate X's arrival.

A comprehensive logging subsystem 140 is provided that logs content arrival and content processing statuses and captures key content delivery and processing metrics and key performance indicators (KPIs). In one embodiment, these metrics are used by anomaly detection algorithms which can trigger operation analysis of content for accuracy, completeness and communication.

In one embodiment, the file system monitor 120 queries the content package registry 130 to determine the identity of the base job 132 for processing the given content type. The base job 132 includes executing the script described above, a job or function run when a type of content arrives or is received, e.g., specified by the host when the host registers with the content package registry. The appropriate job is run within a job farm 134, processing all files identified in the manifest (e.g., 128). In one embodiment, the completion status and processing timestamp are updated in the content package registry 130 for the given content type. An anomaly detection engine 144 may run within the job farm 134 that can proactively detect content delivery failures and/or content quality issues. The job farm 134 in one embodiment may be a subsystem, e.g., a workflow processing engine (e.g., executing on one or more hardware processors). The job farm 134 in one embodiment is responsible for automating the processing script or base job. The job farm 134 in one embodiment evaluates the job definition, and automates the job, running each of the individual job steps in the sequence and in compliance with the conditions outlined in the job definition. In one embodiment, processing details are written to the logging system 140 by the base job 132.

In one embodiment, the registry monitor 136 polls the content package registry 130 on a configured interval. If it detects that base jobs (e.g., 132) have run successfully since the last poll interval, it queries the content package registry 130 to determine which messaging queues supported by the message queuing subsystem 138 should be updated to notify content subscribers of new content, and, for example, for any additional post processing.

An operational dashboard 142, for example, comprising a graphical user interface (GUI) is provided that configures all subsystems of the present disclosure and for visibility to captured delivery receipts, processing log message, processing metrics and KPI reporting. The operational dashboard in one embodiment may be used by the SaaS operations team and a limited set of capabilities can be exposed to the customer as part of overall solution user interfaces (UIs).

In one embodiment, when the registry monitor 136 polls the content package registry 130, it also detects base job failures and when content feeds that were suppose to occur have not occurred, for example, by analyzing schedule, latency window, and base plan processing timestamp stored in the content package registry 130. In one embodiment, errors are reported via configured notification rules and logged for display in the operational dashboard 142.

The system shown in FIG. 1 in one embodiment provides a "zero-footprint" integration mechanism that ties customer's system of records and related extract processing into a cloud hosted SaaS Big Data Analytics platform with content validation, data store loading, and reporting automation. SaaS hosted componentry in one embodiment ensures validated packages are arriving and being processed based on operation's defined schedules, within timeframes and acceptable latency windows and the subscribers are notified for related and/or dependent post-rocessing. Detailed historical logging and related anomaly detection engines that can proactively detect content delivery failures and/or content quality issues that would otherwise have gone unnoticed until the data was already consumed by other downstream analytical processes.

The methodology of the present disclosure in one embodiment may be implemented in establishing a SaaS based Big Data analytic platform that extends on-premise transaction oriented systems, for example, a retail system such as order management systems with advanced analytics and/or optimization capabilities. The methodology of the present disclosure in one embodiment supports such hybrid applications, for example, by enabling the processing of bulk-data feeds from the customers environment into the SaaS environment, for example, with appropriate content packaging and package validation.

The methodology of the present disclosure in one embodiment provides an integration pattern that is minimally invasive to the customer's environment and data extraction processes. For example, by copying an embedded-client into an extraction hosting infrastructure, a customer has a service that can package related content, establish a package manifest, and perform and monitor high-speed file transfers to the cloud environment.

The methodology of the present disclosure in one embodiment may reliably transfer and validate bulk data feeds into the cloud, allowing the adopting entities to integrate their system of record data into a Big Data and analytics hosting environment. Analytic results can be delivered via Solution UIs. The embedded-client may also be utilized to access analytic results from the cloud environment as needed.

In one embodiment, the SaaS hosted components allow for automation of the processing of content packages once they are received into the environment. For example, package arrival detection, package content validation, and package base processing may be completely automated. A single registry (e.g., the content package registry shown in FIG. 1 at 130) may be used to record all content feeds into the environment and a registry monitor (e.g., shown at 136 in FIG. 1) may automatically monitor that those feeds are occurring on schedule within the predefined acceptable latency windows as well as detect when scheduled feeds have failed or have not occurred as configured. The registry and messaging queues (e.g., shown at 138 in FIG. 1) allow for additional dependent processes, post-processing jobs and third party subscribers to be notified of content arrival and processing completion, for example, via a publish/subscribe subscription mechanism. A logging subsystem (e.g., shown at 140 in FIG. 1) may record all processing details and establishes the historical record of feeds over time. The associated logs (coupled with the registry) can be used to generate KPI reporting and notification processing. The logging subsystem and/or the logs can also be integrated into an anomaly detection engine that can use historical run statistics to raise warnings about possible content errors even when overall jobs reported successful completion. An operation dashboard (e.g., shown at 142 in FIG. 1) allows a user such as an operation staff to configure content feeds (registry updates) and analyze log messages and KPIs. This visibility allows proactive issue resolution with the customer before inaccurate or incomplete data is processed by downstream analytics processes.

Figure 2:
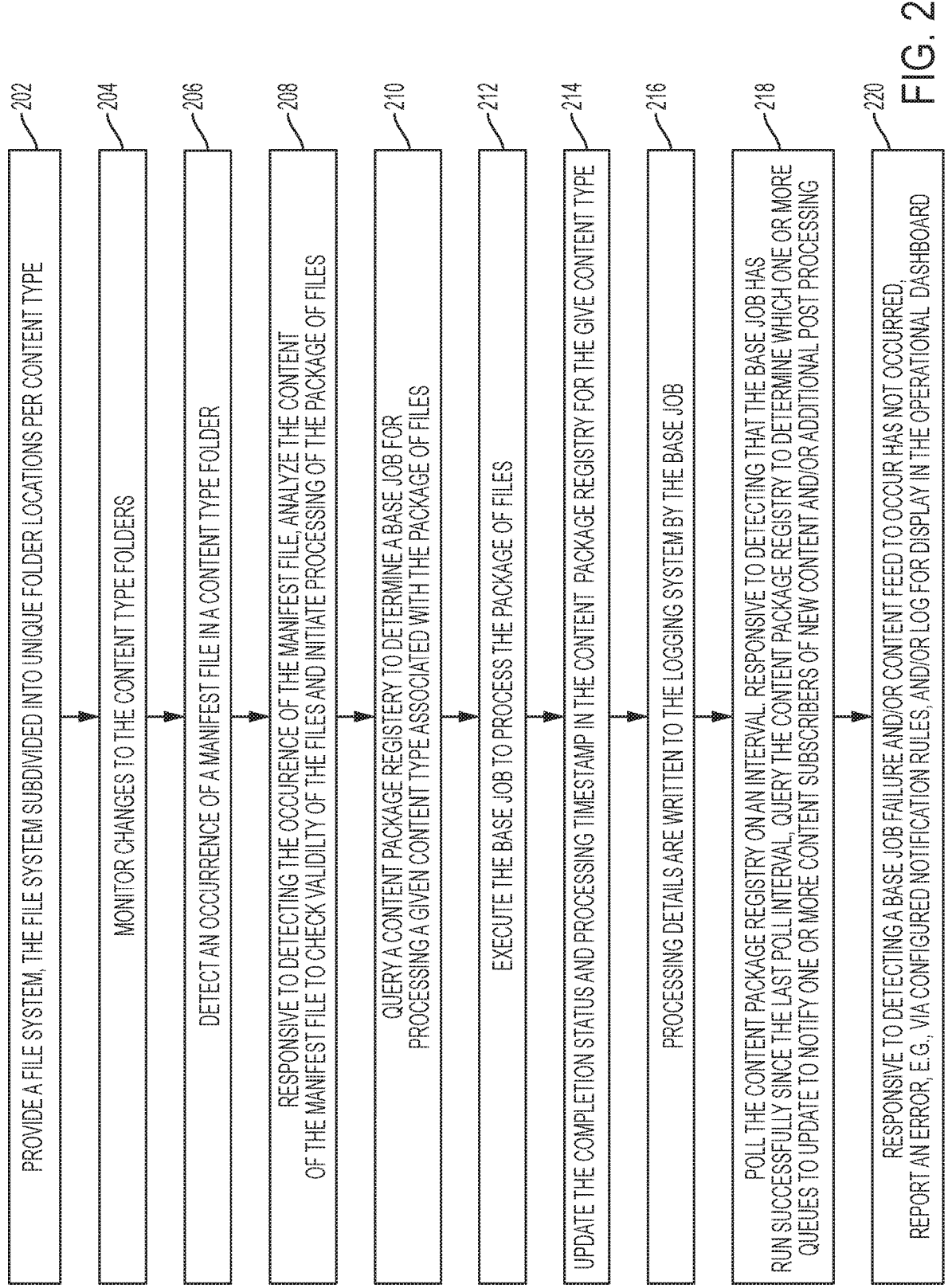
FIG. 2 is a flow diagram illustrating a method of the present disclosure in one embodiment.

FIG. 2 is a flow diagram illustrating a method of the present disclosure in one embodiment. The method, for example, provides a data content delivery and validation mechanism in a computer environment comprising a shared pool of configurable computing resources. At 202, a file system is provided in the computer environment. The file system may be a secure DropBox or the like file system that provide a secure synchronizing file system. In one embodiment, the file system is subdivided into unique folder locations per content type, each of the unique folder locations representing a content type folder.

At 204, a file system monitor executing in the computer environment monitors changes to a content type folder. At 206, the file system monitor detects, based on the monitoring, an occurrence of a manifest file in the content type folder. For example, file system monitor detects all changes to the customer's content type folders. The arrival (or occurrence) of the manifest file in the file system ensures that all files in a package of files associated with the manifest file have arrived.

At 208, responsive to detecting the occurrence of the manifest file, the content of the manifest file is analyzed to check validity of the files and processing of the package of files is initiated. In one embodiment, the processing is only initiated when an occurrence of a manifest file is detected ensuring that no processing occurs until all package files have arrived.

At 210, the file system monitor queries a content package registry to determine a base job for processing a given content type associated with the package of files. At 212, the base job is executed in the computer environment to process the package of files. For example, the file system monitor queries the content package registry to determine the identity of the base job for processing the given content type. The appropriate job is run within the job farm, for example, processing all files identified in the manifest.

In one embodiment, at 214, the completion status and processing timestamp are updated in the content package registry for the give content type. At 216, the base job may write processing details to a logging subsystem.

At 218, the registry monitor may poll the content package registry on an interval or periodic basis. The interval may be configured. Responsive to detecting based on the polling that the base job has run successfully, the registry monitor may query the content package registry to determine which one or more queues to update for notifying one or more content subscribers for new content or post processing or combination thereof. For example, if the registry monitor detects that one or more base jobs have run successfully since the last poll interval, the registry monitor queries the content package registry to determine which queues should be updated to notify content subscribers of new content and/or any additional post processing.

At 220, responsive to detecting based on the polling that the base job has failed or content feed scheduled to occur did not occur or combination thereof, the registry monitor may report an error via one or more notification rules and/or log an error for display in an operational dashboard running in the computer environment. For example, when registry monitor polls the content package registry it also detects base job failures and when content feeds that were suppose to occur have not (e.g., looking at schedule, latency window, and base plan processing timestamp), errors are reported via configured notification rules and logged for display in the operational dashboard.

Figures 3, 4:
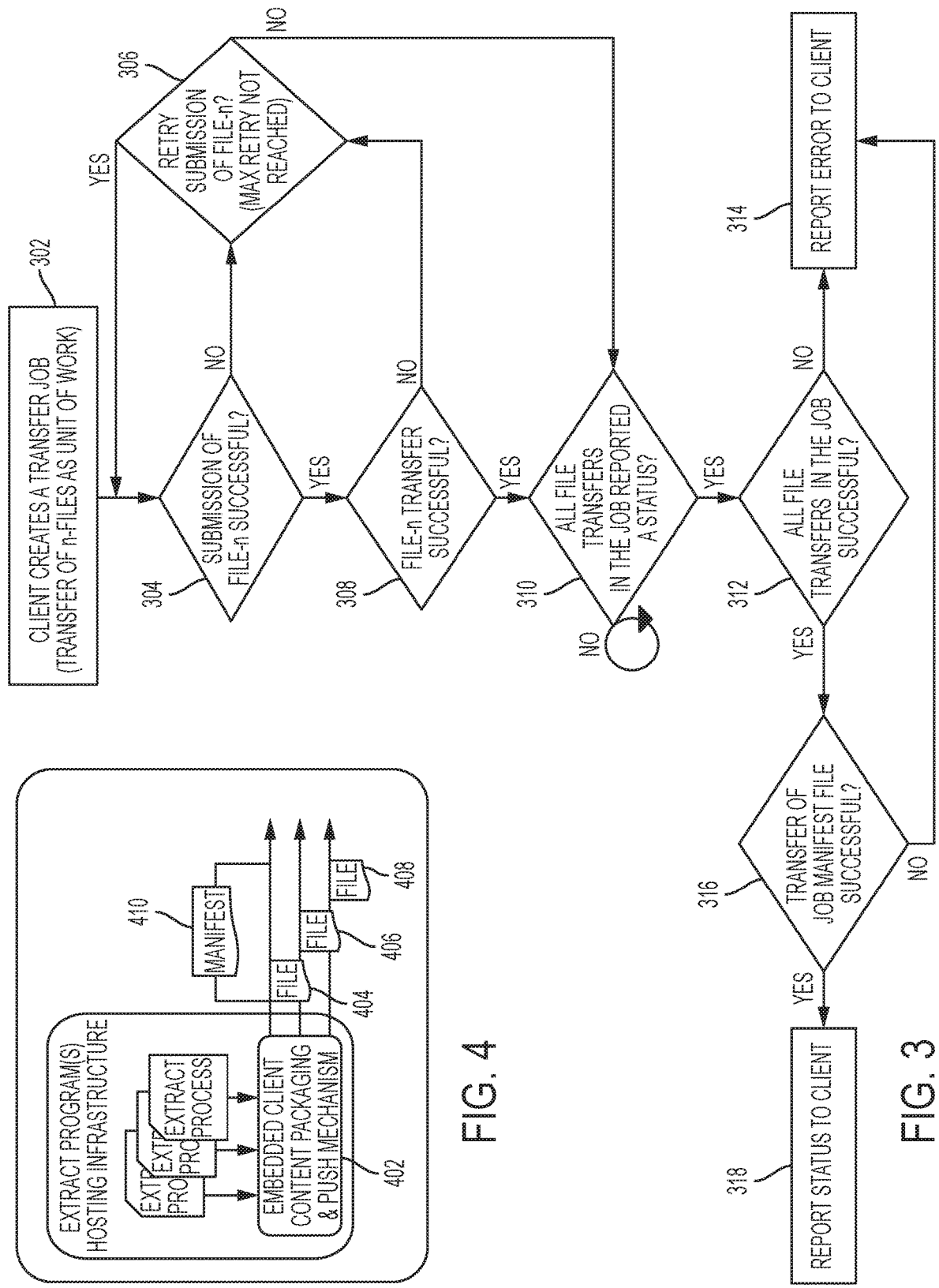
FIG. 3 is a flow diagram illustrating a method performed by an embedded client in one embodiment of the present disclosure.
FIG. 4 shows an embedded client installed on a hosting infrastructure in one embodiment of the present disclosure.

FIG. 3 is a flow diagram illustrating a method performed by an embedded client in one embodiment of the present disclosure. FIG. 4 shows an embedded client installed on a hosting infrastructure in one embodiment of the present disclosure. The method shown in FIG. 3 is performed, for example, by the embedded client 402 shown in FIG. 4 that packages and pushes content to a remote computing environment, e.g., SaaS Cloud environment, for example, as shown in FIG. 1. The communication and/or transferring of data between the hosting infrastructure and the remote computing environment, e.g., SaaS Cloud environment, may be done utilizing one or more communication and/or computer networks. An embedded client 402 can be placed on one or more hosts and an instance of the embedded client 402 can support multiple extract programs. Referring to FIG. 3, at 302, the embedded client (e.g., 402 in FIG. 4) creates a job to transfer for a number of files (n-files) (e.g., 404, 406, 408 in FIG. 4) as unit of work. The content packaging and push mechanism employed in the embedded client (e.g., FIG. 4, 402) wraps all files that make up a complete content package in a transaction. Each file (e.g., FIG. 4, 404, 406, 408) in the package is sent via a separate thread and monitored independently, once all files that make up the package are transferred, the embedded client creates and sends the manifest file (e.g., FIG. 4, 410). The files are sent from an on-premise computer to a remote computer's destination file system folder, e.g., via a network.

Referring to FIG. 3, at 304, it is determined whether the submission of a file-n is successful. Whether the submission is successful may be determined by evaluating the return code of the call to the transmission API or service. Non-zero return codes usually designate errors. Zero return codes designate success. At 306, responsive to determining that the submission of file-n is not successful, the submission of file-n is retried, e.g., if maximum number of retries has not been reached. If the maximum number of retries is reached, the logic proceeds to 310.

If at 304, it is determined that the submission of file-n is successful, the logic proceeds to 308. At 308, it is determined whether file-n transfer is successful. Whether a file transfer is successful may be determined by evaluating the return code of the call to the transmission API or service. Non-zero return codes usually designate errors. Zero return codes designate success. Submission at 304 sets up a transfer job. The submission process includes checking for the presence/availability of the file(s) to transfer and creating a thread for each individual transfer job. Transfer at 308 is the actual movement of the file, from the client to the server (e.g., drop box type of server). If it is determined that a file-n transfer is not successful, the logic proceed to 306 where the submission of file-n is retried, e.g., if the maximum number of retries has not reached. In one embodiment, both submission and transfer are retried, e.g., to ensure each file can be accessed for the overall job and a thread can be started for each, and that each individual transfer completes.

The processing at 304, 306 and 308 are performed for each of the files in the job or unit of work, for example, in parallel by separate execution threads, for example, running simultaneously. So for example, one thread may process one file submission and transfer. For instance, referring to FIG. 4, a thread may handle the file at 404, another thread may handle the file at 406, and yet another thread may handle the file at 406.

Referring back to FIG. 3, responsive to determining at 308, that a file-n transfer is successful, at 310, it is determined whether all file transfers in the job reported a status. If not, the logic at 310 waits for all files transfers to report a status. Responsive to determining at 310 that all file transfers in the job reported a status, the logic proceeds to 312.

At 312, it is determined whether all file transfers in the job are successful. Responsive to determining that not all file transfers in the job are successful, the logic proceeds to 314. At 314, error status is reported to client (402 in FIG. 4).

Responsive to determining that all file transfers in the job are successful, a job manifest file is sent, and it is determined at 316 whether the transfer of job manifest file is successful.

Responsive to determining that transfer of job manifest file is not successful, error status is reported to client at 314. Responsive to determining at 316 that the transfer of job manifest file is successful, at 318, the transfer status is reported to client.

Figure 5:
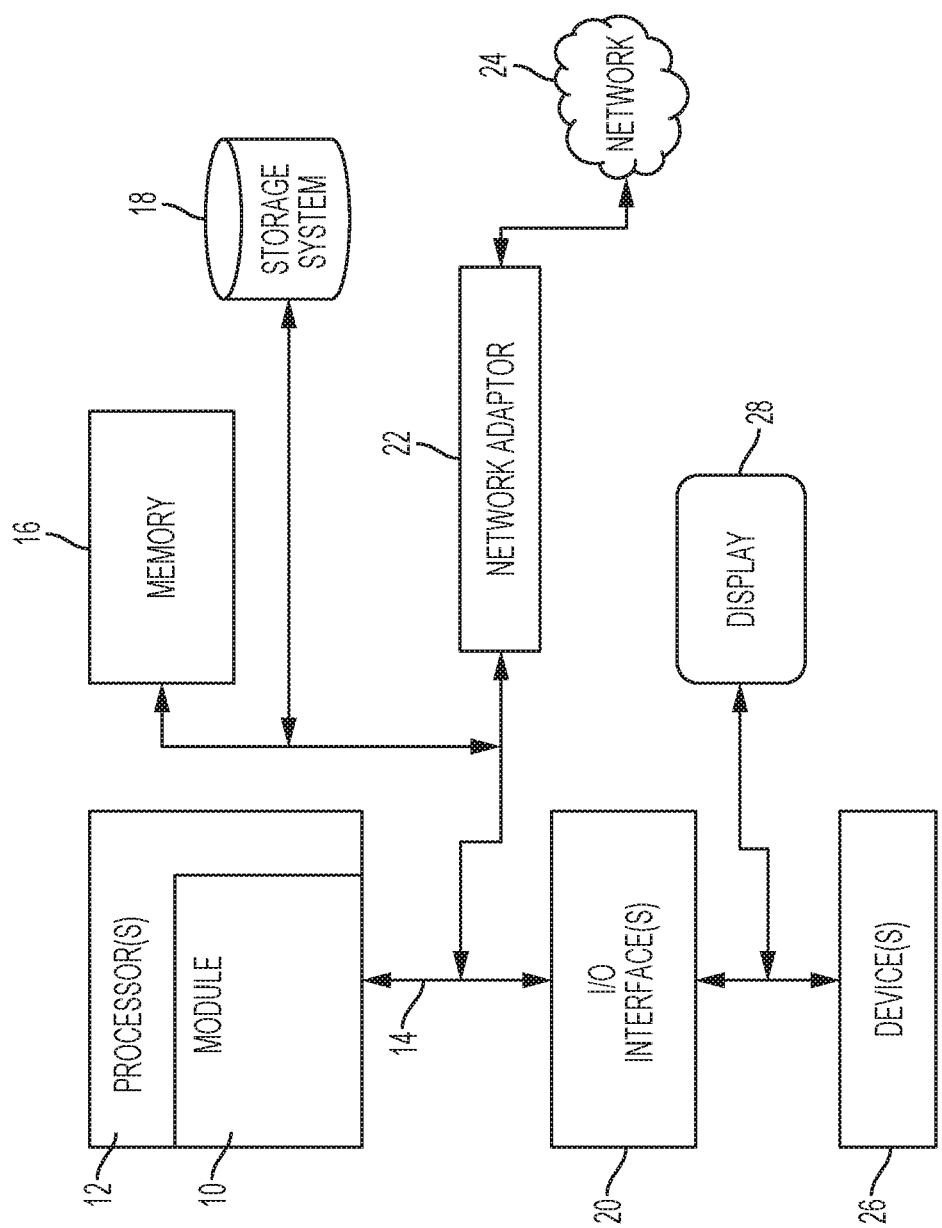
FIG. 5 illustrates a schematic of an example computer or processing system that may implement a content delivery and validation system in one embodiment of the present disclosure.

FIG. 5 illustrates a schematic of an example computer or processing system that may implement a content delivery and validation system in one embodiment of the present disclosure. The computer system is an example system that may implement an embedded client in an on-premise environment. The computer system may also be an example system that may implement components such as the file system, content type folder, content package registry, registry monitor, job farm, logging system, operational dashboard and messaging queues described above with reference to FIG. 1. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of data content delivery and validation in a computer environment, the method comprising:
subdividing a file system in the computer environment into a plurality of content type folders, each content type folder comprising content of a certain type;
identifying an arrival of a manifest file associated with a package of files in at least one content type folder of the plurality of content type folders;
analyzing the manifest file to check validity of the package of files;
determining a base job for processing the type of content associated with the package of files; and
in response to determining that each file of the package of files that is indicated in the manifest file is received by the at least one content type folder, running the base job in the computer environment prior to processing the package of files.

2. The method of claim 1, wherein the analyzing the manifest file comprises:
determining that each file of the package of files that is indicated in the manifest file is received by the at least one content type folder.

3. The method of claim 1, further comprising:
determining a status of the running of the base job on an interval basis until a completion of the running of the base job prior to processing the package of files.

4. The method of claim 1, further comprising:
responsive to determining that the base job has failed, reporting an error via a notification rule.

5. The method of claim 1, further comprising:
responsive to determining a non-occurrence of at least one file of the package of files in the at least one content type folder within a latency window, reporting an error via a notification rule.

6. The method of claim 1, wherein the analyzing the manifest file includes:
determining that a size of each of the package of files received by the at least one content type folder matches a size of each of the package of files indicated in the manifest file.

7. The method of claim 1, wherein the package of files includes a content arrival script describing the base job for the package of files.

8. A system comprising:
one or more processors; and
a computer-readable medium comprising instructions stored therein, which when executed by the one or more processors, cause the one or more processors to:
subdivide a file system in a computer environment into a plurality of content type folders, each content type folder comprising content of a certain type;
identify an arrival of a manifest file associated with a package of files in at least one content type folder of the plurality of content type folders;
analyze the manifest file to check validity of the package of files;
determine a base job for processing the type of content associated with the package of files; and
in response to determining that each file of the package of files that is indicated in the manifest file is received by the at least one content type folder, run the base job in the computer environment prior to processing the package of files.

9. The system of claim 8, wherein the instructions to analyze the manifest file include instructions to:
determine that each file of the package of files that is indicated in the manifest file is received by the at least one content type folder.

10. The system of claim 8, wherein the instructions, when executed by the one or more processors, further cause the one or more processors to:

determine a status of the running of the base job on an interval basis until a completion of the running of the base job prior to processing the package of files.

11. The system of claim 8, wherein the instructions, when executed by the one or more processors, further cause the one or more processors to:

responsive to determining that the base job has failed, report an error via a notification rule.

12. The system of claim 8, wherein the instructions, when executed by the one or more processors, further cause the one or more processors to:

responsive to determining a non-occurrence of at least one file of the package of files in the at least one content type folder within a latency window, report an error via a notification rule.

13. The system of claim 8, wherein the instructions to analyze the manifest file include instructions to:

determine that a size of each of the package of files received by the at least one content type folder matches a size of each of the package of files indicated in the manifest file.

14. The system of claim 8, wherein the package of files includes a content arrival script describing the base job for the package of files.

15. A non-transitory computer-readable storage medium comprising computer-readable instructions, which when executed by one or more processors in a computing system, cause the computing system to:

subdivide a file system in a computer environment into a plurality of content type folders each content type folder comprising content of a certain type;

identify an arrival of a manifest file associated with a package of files in at least one content type folder of the plurality of content type folders;

analyze the manifest file to check validity of the package of files;

determine a base job for processing the type of content associated with the package of files; and in response to determining that each file of the package of files that is indicated in the manifest file is received by the at least one content type folder, run the base job in the computer environment prior to processing the package of files.

16. The non-transitory computer-readable storage medium of claim 15, wherein the computer-readable instructions to analyze the manifest file include instructions to:

determine that each file of the package of files that is indicated in the manifest file is received by the at least one content type folder.

17. The non-transitory computer-readable storage medium of claim 15, wherein the computer-readable instructions, when executed by the one or more processors, further cause the computing system to:

determine a status of the running of the base job on an interval basis until a completion of the running of the base job prior to processing the package of files.

18. The non-transitory computer-readable storage medium of claim 15, wherein the computer-readable instructions, when executed by the one or more processors, further cause the computing system to:

responsive to determining that the base job has failed, report an error via a notification rule.

19. The non-transitory computer-readable storage medium of claim 15, wherein the computer-readable instructions, when executed by the one or more processors, further cause the computer system to:

responsive to determining a non-occurrence of at least one file of the package of files in the at least one content type folder within a latency window, report an error via a notification rule.

20. The non-transitory computer-readable storage medium of claim 15, wherein the computer-readable instructions to analyze the manifest file include instructions to:

determine that a size of each of the package of files received by the at least one content type folder matches a size of each of the package of files indicated in the manifest file.

* * * * *

UNITED STATES PATENT AND TRADEMARK OFFICE
CERTIFICATE OF CORRECTION

PATENT NO. : 11,488,095 B2
APPLICATION NO. : 16/400291
DATED : November 1, 2022
INVENTOR(S) : Ajay A. Deshpande et al.

It is certified that error appears in the above-identified patent and that said Letters Patent is hereby corrected as shown below:

In the Claims

Column 16, Line 27, Claim 19, please delete "computer" and insert --computing--

Signed and Sealed this
Fourth Day of April, 2023

*Katherine Kelly Vidal*
*Director of the United States Patent and Trademark Office*